United States Patent [19]

Jorgens et al.

[11] Patent Number: 4,958,920
[45] Date of Patent: Sep. 25, 1990

[54] PROCESS AND APPARATUS FOR THE AUTOMATIC FOCUSING OF MICROSCOPES

[75] Inventors: Reinhard Jorgens, Oberkochen; Bernd Faltermeier, Aalen, both of Fed. Rep. of Germany

[73] Assignee: Carl-Zeiss-Stiftung, Heidenheim/Brenz, Fed. Rep. of Germany

[21] Appl. No.: 395,769

[22] Filed: Aug. 18, 1989

[30] Foreign Application Priority Data

Aug. 20, 1988 [DE] Fed. Rep. of Germany ....... 3828381

[51] Int. Cl.$^5$ .......................... G02B 21/26; G01J 1/20
[52] U.S. Cl. .................................... 350/530; 350/522; 250/201.3; 250/201.4
[58] Field of Search ............... 350/507, 518, 521, 523, 350/529, 530, 522; 250/201.3, 201.4

[56] References Cited

U.S. PATENT DOCUMENTS

| | | | |
|---|---|---|---|
| 3,883,689 | 5/1975 | Mansour et al. | 178/7.2 |
| 4,600,832 | 7/1986 | Grund | 250/201 |
| 4,639,587 | 1/1987 | Chadwick et al. | 250/201 |
| 4,737,022 | 4/1988 | Faltermeier et al. | 350/518 |
| 4,897,537 | 1/1990 | Miyamoto et al. | 350/507 |
| 4,902,101 | 2/1990 | Fujihara et al. | 350/521 |

FOREIGN PATENT DOCUMENTS

| | | |
|---|---|---|
| 3328821 | 2/1986 | Fed. Rep. of Germany . |
| 3446727 | 4/1986 | Fed. Rep. of Germany . |
| 1401179 | 7/1975 | United Kingdom . |
| 1545437 | 5/1979 | United Kingdom . |

Primary Examiner—Bruce Y. Arnold
Assistant Examiner—Ronald M. Kachmarik
Attorney, Agent, or Firm—Stonebraker, Shepard & Stephens

[57] ABSTRACT

Fast and versatile autofocusing for microscopes is achieved by the interaction of two known systems: a first, active autofocusing system (12) which projects at least one light dot on the object and develops a focusing signal dependent upon the character of a reflection of the dot; and a second, passive autofocusing system which creates a video signal representative of an image of the object and then uses the image contrast of that video signal as a focusing criterion. Provided for both systems is a joint control unit (45) to which the signals (g), (f) of both focusing systems are transmitted and which, successively, activates first the active and then the passive autofocusing system. The process can be used to focus on both covered and uncovered objects illuminated by transmitted as well as reflected light. Quick, automatic focusing is accomplished in that the active focusing system rapidly focuses first on either the cover glass surface or the object surface and then control is switched to the passive autofocusing system which only needs to travel a very short distance to achieve accurate final focus of a preselected plane of the object.

12 Claims, 4 Drawing Sheets

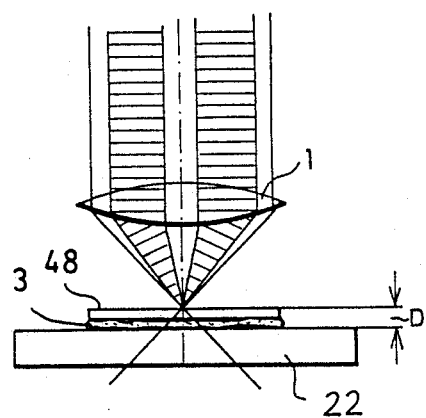
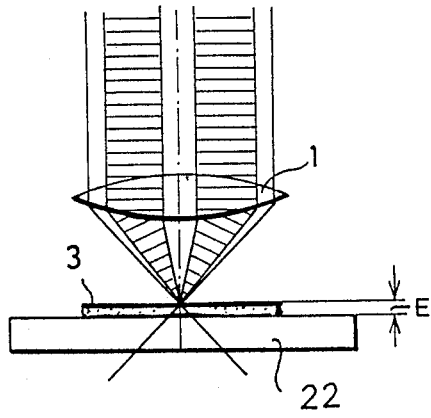
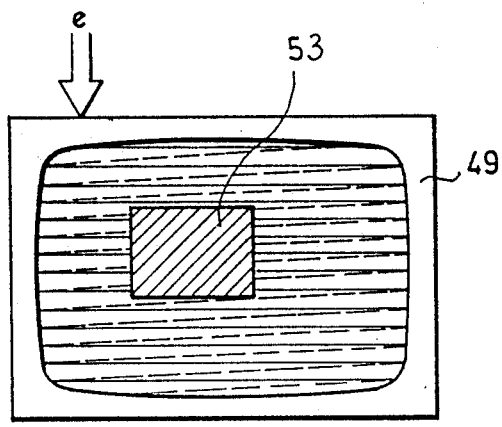

PROCESS AND APPARATUS FOR THE AUTOMATIC FOCUSING OF MICROSCOPES

BACKGROUND

Autofocus systems presently used for microscopes can roughly be divided into two different classes. The first class includes so-called "active" autofocusing systems. These project at least one auxiliary light dot or mark onto the surface of the object being examined and evaluate the character of the light dot (e.g., its shape, size, position) to create a focusing criterion. Such active autofocusing systems have been described in German Pat. Nos. 3328821 and 3446727 and also in U.S. Pat. No. 4,639,587. These active systems are predominantly used in reflected light microscopes and have the advantage of working very fast, i.e., that they are able to quickly follow movements of the object. In addition, they possess a relatively large capture range, i.e., they are capable of focusing through a relatively deep field.

However, active systems are not readily suited for microscopic examinations of transmitted light objects and, specifically, of covered transmitted light objects. This is because, in the case of covered objects, the object plane itself does not produce a reflection. Instead, the reflection of the auxiliary light dot occurring on the cover glass is normally so strong that the autofocusing device will focus not on the object plane but on the cover glass surface. Further, the same problem can occur also with uncovered objects, since the actual object plane being observed often is not identical with the object surface but may lie within the object. While this off-object focus could be compensated by providing an additional focusing-motion adjustment varying in accordance with the cover glass thickness, such would be possible only for objectives having a relatively small lateral magnification factor. Objectives with larger lateral magnification factors have much smaller focal depths, so the distance between the cover glass surface and the object plane is often greater than the capture range that would normally be required for an active autofocusing procedure.

It would also be possible, when trying to focus on covered objects with such known active systems, to provide specific correction lenses for the auxiliary lighting of the autofocusing device. Such special lenses would be designed to have one focus position for the visible light used for observation of the object and another focus position for the auxiliary lighting device (which normally operates in the infrared range), and the lens design would separate these two focus positions by the cover glass thickness. However, even ignoring the expense of the special lens system, this solution would have serious disadvantages. For one, cover glass thickness is normally subject to fluctuations; and for another, wavelength-dependent focal differences vary from lens to lens so that, especially in the case of lenses with a large lateral magnification factor and small focal depth, such a system would be unable to effect sufficiently accurate focusing.

Further, active autofocusing systems are also often less than satisfactory (a) when used with uncovered objects which possess a very uneven surface and/or (b) when the surface is not identical with the object plane that is of interest. In such cases, reflection of the auxiliary light is dispersed and thus greatly weakened, preventing proper autofocusing, or the measuring dot may impinge on lands or holes in the surface of the reflected light object and thus focus on a plane that is not desired. A widening of the projected measuring dot offers no solution to this problem because the focusing will then average out on an intermediate plane which similarly does not necessarily correspond to the actual object surface.

Because of these just-mentioned limitations of active autofocusing systems, the second general class of autofocusing systems, which are characterized as "passive", are predominantly used in transmitted light microscopes. These passive autofocusing systems evaluate a video signal of the object's image. The key criterion for focusing such passive systems is normally the image contrast, which can be determined in various ways. Such passive autofocus systems are known in the art, e.g., see British Pat. Nos. 1,401,179 and 1,545,437 and U.S. Pat. No. 4,600,832.

However, prior autofocus systems of the passive type work rather slowly; and since image contrast does not contain any directional information, an initial "search pass" must be made before the automatic circuitry can find the point of maximum contrast. There are known passive systems, e.g., as shown in U.S. Pat. No. 3,883,689, which do obtain directional information by arranging two image sensors, respectively, before and after the image plane. However, since such systems require multiple, complex beam splitting, they double the intervention in the microscope's transmitted light path and, besides, need at least one additional camera just for the autofocusing, in addition to the camera used to develop the video signal of the image. Also, the expense of this solution is thus very high.

Another disadvantage of passive video autofocus systems lies in their relatively short capture range, i.e., the distance through which the automatic device focuses and/or performs the search pass. If the capture range is made too large, there is a danger that the automatic device will focus on so-called "parasitic planes", e.g., image planes of surfaces of optical components in the microscope, such as a dirty condenser lens, etc.

The problem underlying the present invention is the need to provide an autofocus system for microscopes which can perform effectively both for reflected light operation and also for viewing of covered and uncovered transmitted light objects and which can perform at high speed and with appropriate accuracy.

SUMMARY OF THE INVENTION

The invention comprises a process which operates in two stages, using a known active autofocus system to focus first on either the cover glass surface of covered transmitted light objects or, in the case of uncovered objects, near the actual object surface. After this first focusing stage, the process switches to a known passive autofocus system which very rapidly achieves final focus because only short distances need to be traveled during performance of the search pass, thereby permitting the plane with the maximum contrast to be found very quickly and without involving the danger of focusing on parasitic planes.

This invention combines the advantages of both active an passive autofocusing systems without suffering the respective disadvantages of either. The final focusing difficulties described above in conjunction with active systems are not a problem, because the passive system assumes the final focusing. Further, since each of the focusing systems can be controlled by the same electronic components, the two autofocusing systems can be combined at a distinctly reduced expense as compared to two separate systems. A microscope equipped already with an active autofocusing system can thus be modified and improved according to this invention without major expense.

DRAWINGS

Figure 1:
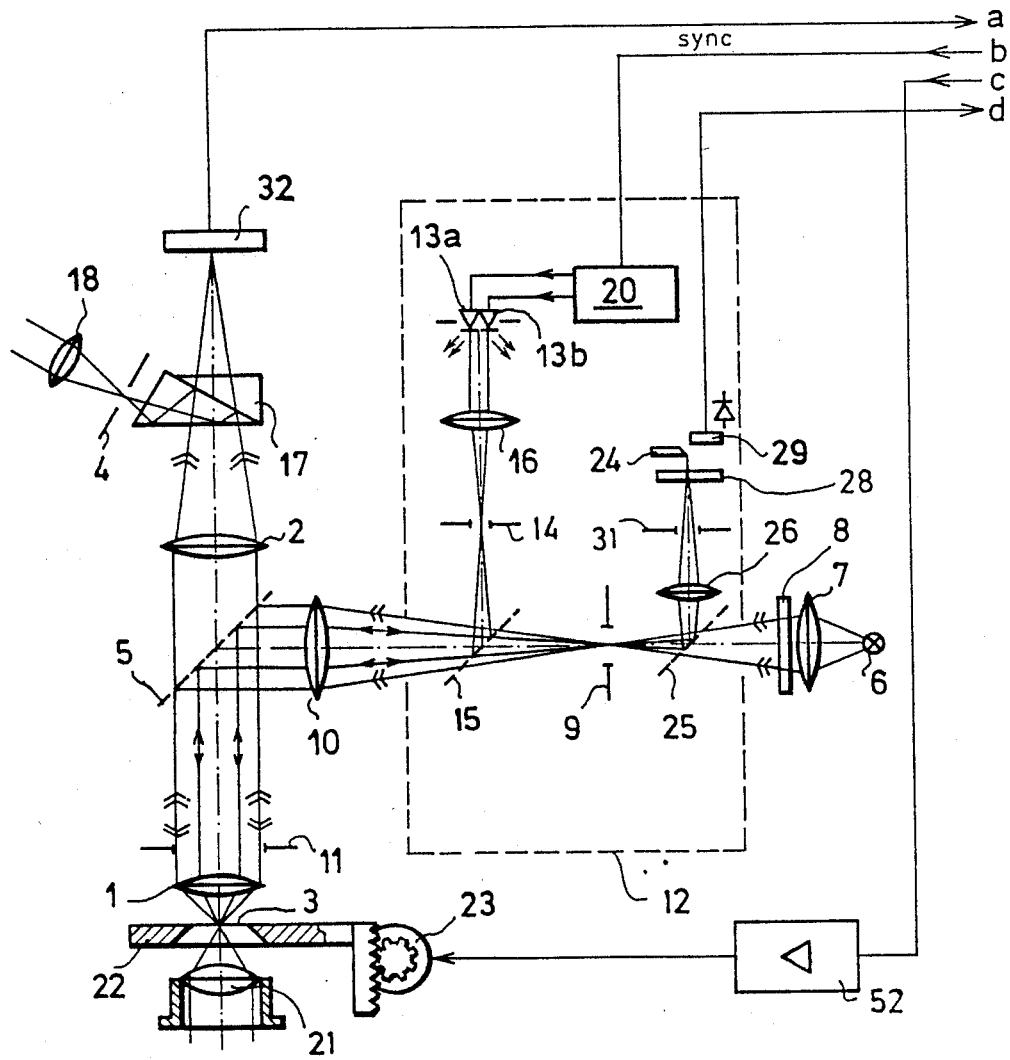
FIG. 1 is a schematic diagram of the lens system of a microscope having elements for both active and passive autofocusing.

FIGS. 3a and 3b schematically represent the lens of the microscope in FIG. 1 positioned above, respectively, a covered object and an uncovered object.

FIG. 4 represents schematically a monitor connected to the image sensor (32) in FIG. 1.

Figure 5:
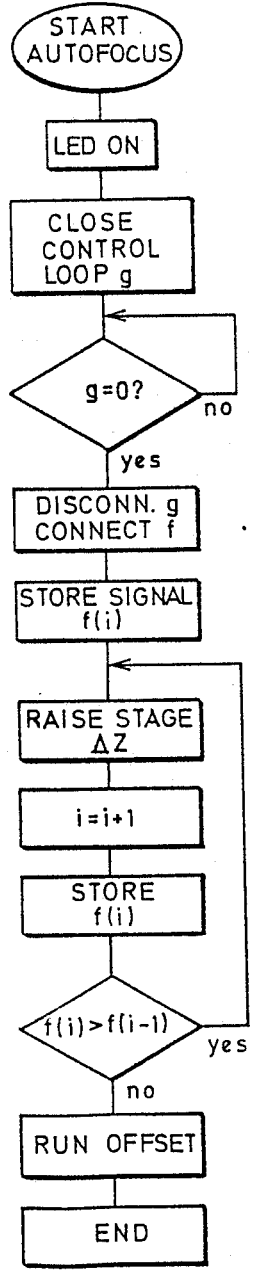
Figure 6:
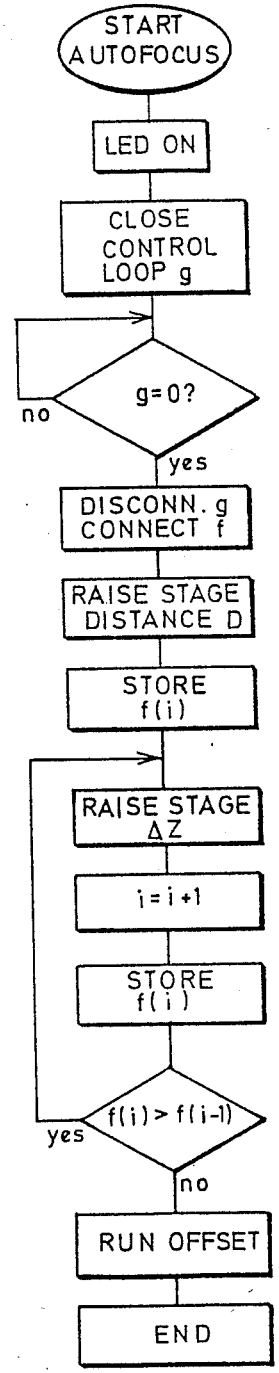

FIGS. 5 and 6 are flow charts of possible operating sequences for controlling the autofocusing apparatus.

DETAILED DESCRIPTION

Illustrated in FIG. 1 are the components of a microscope required for understanding the invention. The observation ray path contains a lens (1) and a tube lens (2) which project the object (3) in the intermediate image plane (4) where the object can be viewed with the aid of the eyepiece (18). Incorporated between eyepiece (18) and tube lens (2) is a beam splitter (17), and arranged behind the second image exit of splitter (17) is an image sensor (32), such as a video camera.

The relative distance between lens (1) and the stage (22) of the microscope is adjustable by means of a focusing drive, namely, drive motor (23). Located below stage (22) is the condenser (21) that is needed for transmitted light illumination.

Contained between lens (1) and tube lens (2) is a semitransparent divider mirror (5) through which the transmitted light rays originating from the microscope's incandescent light source (6) are introduced into the observation ray path. Dividing mirror (5) may be designed specially to reflect the selective wavelength (e.g. infrared) projected by the auxiliary light source of the active autofocusing system which will be explained below; i.e., dividing mirror (5) may have a greater reflection capacity for the selected wavelength of the auxiliary illumination than it has for the light of the "normal" microscope illumination originating from incandescent bulb (6).

The microscope's reflected light ray path is illustrated here in simplified fashion. It comprises a collector (7), an IR-stop filter (8), a lamp condenser diaphragm (9), and an auxiliary lens (10). Also illustrated in simplified fashion are the light projecting and receiving components of the active autofocusing system, shown combined as a module (12).

Arranged between lamp condenser diaphragm (9) and auxiliary lens (10) is a semitransparent beam splitter (15) through which the auxiliary illumination beam of the active autofocusing system is deflected into the microscope's reflected illumination ray path.

Two light sources (13a and 13b), which may be light-emitting or laser diodes, project the auxiliary illumination of the active autofocusing system. The light sources (13a, 13b) are arranged side-by-side in a plane conjugated to an aperture diaphragm (11) and are alternately pulsed by a driver circuit (20), delivering their respective pulsed rays into the microscope's incandescent light path through a condenser (16), a diaphragm (14), and beam splitter (15).

The portion of this auxiliary light which is reflected by beam splitter (15) proceeds through auxiliary lens (10), reflector (5), and lens (1) and impinges as a dot or mark on object (3) or its cover glass. This dot or mark of auxiliary light is reflected there in a manner contingent on the surface properties of the object or its cover glass. This reflection of the auxiliary light then impinges again on beam splitter (15), passing through it, and thereafter is deflected out of the microscope's illumination path by a dichromatic dividing mirror (25).

A lens (26) focuses the reflected auxiliary light (hereinafter referred to as a "measuring light ray") after its passage through a stray light diaphragm (31) and a filter (28) in the plane of a diaphragm (24), which at this point masks one side of the field of view and which lies conjugated to the object plane. Directly behind diaphragm (24) is a detector (29) which emits the first focusing signal of the active autofocusing device. This signal is transmitted along line (d).

As mentioned above, an image-producing sensor (32), e.g., a tubular camera or a CCD camera, is attached to the photographic image plane, i.e., the second image exit of splitter (17), as illustrated in FIG. 1. With this camera, as will be described further below, the image of the viewed object can be reproduced on the screen of the monitor illustrated in FIG. 4. The video signal of sensor (32) is transmitted through a signal line (a) which, along with earlier-described signal line (d) from detector (29), is connected to the electronic setup illustrated in FIG. 2. The corresponding connections are identified in FIGS. 1 and 2 by the same letters.

Figure 2:
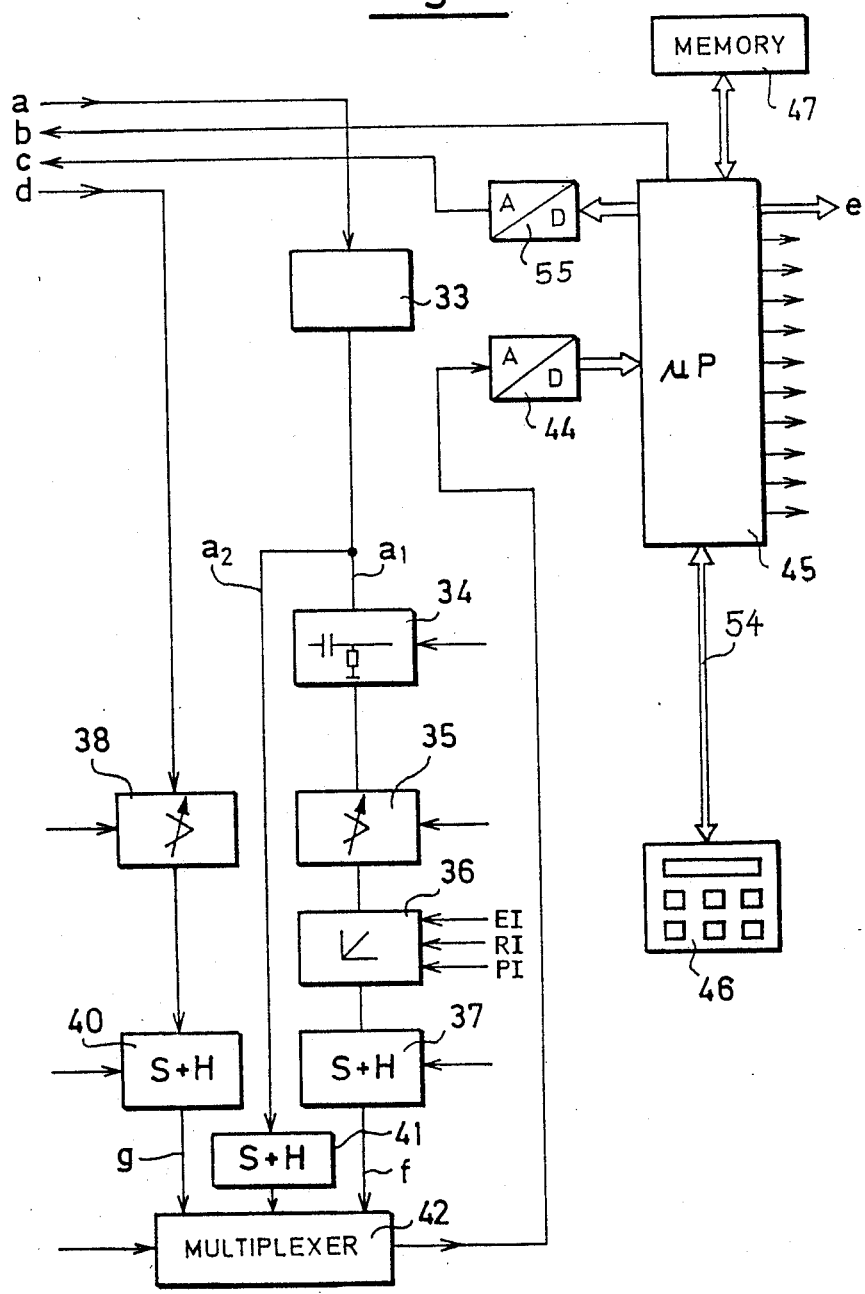
FIG. 2 is a block diagram of the electronic system used for signal processing and control of the autofocusing devices shown in FIG. 1.

The core of the electronic system illustrated in FIG. 2 is a microprocessor (45) which, as will be described hereafter, controls the processing of the signals produced by detector (29) and image sensor (32), deriving from these signals the focusing control instructions for motor (23) in FIG. 1. Motor (23) is energized through a final motor stage (52) which appropriately adapts the control signals transmitted from microprocessor (45) on line (c).

Additionally, microprocessor (45) is connected through a line (b) with driver circuit (20) for synchronizing the pulse frequency of light sources (13a, 13b) of the active focusing system.

As can be seen from FIG. 2, the first focusing signal from detector (29) of the active autofocusing system is transmitted on line (d) to an adjustable amplifier (38). Microprocessor (45) is preset to control the amplification of amplifier (38) in accordance with the reflective properties of object (3) in order to maintain a relatively constant signal level.

A sample and hold stage (40) samples the output signal of amplifier (38) in synchronism with the pulse frequency of light sources (13a, 13b), and the output signal of sample and hold stage (40) is transmitted over line (g) to an input of a multiplexer (42). This multiplexer is connected to microprocessor (45), which analyzes the active focusing signals in coordination with the alternately blinking light sources (13a, 13b) and, concurrently, introduces corrections which allow for microscope-contingent effects such as those referred to above relating to the reflection characteristics of the object being viewed. So processed, the corrected first focusing signal is transmitted to final motor stage (52) through a digital/analog converter (55) and line (c).

The video signal of image sensor (32) is transmitted on line (a) to a blanking stage (33) which eliminates those portions of the signal extraneous to object image information, e.g., reflections of the pulsed illumination from active focusing module (12). Thereafter, the video signal path splits. In the branch marked $a_1$, the signal proceeds through a high pass filter (34) having reversible parameters to a video preamplifier (35) which is adjustable to balance the conditions of varying contrast found on different objects being examined.

Amplifier (35) is followed by an integrator (36) with reversible parameters (PI) and with integration start and integration end controlled, respectively, by microprocessor (45) through the "enable" (EI) and "reset" (RI) signal inputs. With proper adjustment of integrator (36), the portion of the video signal being used for passive focusing can be limited to correspond only to a specific area of the image, for instance, as shown in FIG. 4, only to the video signal corresponding to selected image field (53) on the monitor (49). This selection can be made with the control panel (46) which is connected with the microprocessor (45) through a databus (54).

Integrator (36) is followed by a second sample and hold stage (37). Here, the passive focusing system temporarily stores analog values of the image contrast of the video signal and searches for maximum image contrast to generate a second focusing signal which is transmitted on line (f) to an input of multiplexer (42). Thus, this second focusing signal is derived from only the high-frequency portion of the video signal of image sensor (32) and can be made responsive to the maximum contrast of either the entire image or just a selected section of the image. This signal evaluation takes place in real time and, therefore, is especially fast.

The output of multiplexer (42) connects through an analog/digital converter (44) to microprocessor (45). The latter separately receives and evaluates the digital values of focusing signals (g) and (f), respectively, and controls the focusing operation of motor (23) via line (c) in accordance with a preselected program.

Attention is now called to the parallel signal path marked $a_2$, in which the video signal from blanking stage (33) is transmitted directly to a fast sample and hold module (41), the output of which is also transmitted through multiplexer (42) and analog/digital converter 44, making it possible to send the digitized video signal of the entire object image to monitor (49) through databus (e) and, as well, into a video memory (47), where it can be available not only for further contrast evaluation but also for additional image processing routines, making it possible to produce focusing criteria different from the rather simple analog contrast evaluation performed in path $a_1$.

A number of different programs can be selected through operating panel (46). In addition to relatively simple programs which use only one of the two respective signals (g) and (f) for focusing, keys on operating panel (46) permit selection of subprograms for "Alignment" and "Offset Adjustment" as well as "Combined Autofocus" which programs the just-described apparatus according to the present invention.

The "Combined Autofocus" program will now be described with reference to FIGS. 3a and 3b and the flow chart illustrated in FIG. 5, and it runs as follows:

Let it be presumed that the operator has used the "Alignment" subprogram to adjust the amplification of the two amplifiers (35) and (38) appropriately to adapt to the contrast and reflection properties of the object being viewed, and that the upper surface of cover glass (48), which covers the object (3), lies within the capture range of the active autofocusing system (12). The operator initiates the process by pressing the key "autofocus on", which causes microprocessor (45) to activate driver circuit (20) of the active autofocusing system and energizes drive motor (23), moving stage (22) until signal (g) from detector (29) quickly drops to zero indicating correct initial focusing. In this position, the focus is on either the surface of cover glass (48), such as illustrated in FIG. 3a or, respectively, on the surface of uncovered object (3) as shown in FIG. 3b.

Next, microprocessor (45) shuts off active autofocusing system (12) and begins to move stage (22) in a "search pass", namely, further in the direction toward lens (1). During this search pass, microprocessor (45) evaluates signal (f) of the passive autofocusing device, comparing successive signal values of sample and hold stage (37) with each other. The pass continues so long as the contrast signal (f) continues to increase. However, as soon as the maximum signal is reached, object (3) is in final focus and motor drive (23) is stopped. Therefore, the maximum distance through which stage (22) must be moved for the search pass is limited to the relatively short combined thickness (D) of cover glass (48) and object (3).

As a last step, stage (22) can then be further adjusted by an "offset" previously determined by the user and stored in microprocessor (45). This offset corresponds to the difference between the plane with the best focus impression visually observed by the user and the plane in which the passive focusing system determines the maximum contrast. Appropriate "offset" correction values can be established ahead of time for various lenses on the microscope and stored in microprocessor (45).

A somewhat different mode of operation is described in the flow chart shown in FIG. 6. In this operation, the microscope is again focused initially on the surface of cover glass (48) by means of the active autofocusing system. However, as soon as the first focusing signal (g) has reached its zero value, stage (22) is quickly raised further by an amount (D) that was previously stored in microprocessor (45) and corresponds to the thickness of the cover glass used. This reduces the distance required for the search pass to only the depth (E) of object (3) so that only a very short time elapses before signal (f) reaches its maximum value and final focus is achieved.

We claim:

1. A method for the automatic focusing of a microscope having a stage for holding an object to be viewed by an objective lens, said stage and said lens being movably adjustable relative to each other by a focusing drive, and also having both active and passive focusing apparatus, comprising the steps of:
    a. activating said active focusing apparatus to generate a first focusing signal;
    b. operating said focusing drive in response to said first signal to adjust the distance between lens and stage to a first focus position;
    c. activating said passive focusing apparatus to generate a second focusing signal having a varying value;
    d. operating said focusing drive to vary the distance between stage and lens from said first focus position by moving one relative to the other through a search pass; and e. stopping said focusing drive at a final focusing position responsive to a predetermined value of said second signal.

2. The method of claim 1 wherein step (a) comprises the steps of:
projecting a light dot onto the surface of the object; and
analyzing the character of a reflection of said dot to generate said first focusing signal.

3. The method of claim 1 wherein step (c) comprises the steps of:
sensing an image of the object;
producing a video signal corresponding to said image; and
generating said second focusing signal as a function of the image contrast of said video signal;
and wherein step (e) comprises the step of:
stopping said relative search pass movement when said second focusing signal indicates that said image contrast has attained a maximum value.

4. The method of claim 3 wherein said second focusing signal is generated as a function of the image contrast of only a portion of said video signal corresponding to only a partial area of said object image.

5. The method of claim 1 wherein said search pass movement is limited to a distance corresponding to the thickness of said object.

6. The method of claim 1 wherein the object being viewed is under a cover glass, and wherein said search pass is limited to a distance corresponding to the combined thickness of said object and the cover glass.

7. The method of claim 6 comprising the further steps of:
measuring the approximate thickness of the cover glass; and
adjusting the relationship between said stage and lens from said first focus position through a distance corresponding to said thickness prior to initiating the search pass.

8. Apparatus for automatically focusing a microscope having a stage for receiving an object to be viewed and motor means for movably adjusting the relative distance between said stage and a lens, comprising:
active focusing means for projecting at least one light dot onto the surface of the object, receiving a reflection of the dot or dots, and generating a first focusing signal which varies in accordance with the characteristics of said reflection;
passive focusing means for sensing an image of the object, producing a video signal corresponding to said image, and generating a second focusing signal as a function of the image contrast of said video signal; and
control means for sequentially activating said active and passive focusing means and for energizing said motor means to adjust the relative distance between said lens and stage to a first position in response to said first focusing signal and, thereafter, to a final position in response to said second focusing signal.

9. The apparatus of claim 8 wherein said control means comprises a multiplexer for receiving and separately transmitting said signals and a microprocessor for receiving said separately transmitted signals, for controlling said focusing systems, and for energizing said motor means in response to said focusing signals.

10. The apparatus of claim 8 wherein said video signal is passed through a high pass filter and an adjustable amplifier.

11. The apparatus of claim 10 wherein said video signal is transmitted through an integrator having adjustable integration parameters.

12. The apparatus of claim 8 wherein the video signal is transmitted through two parallel paths one of which delivers said signal to an image memory.

* * * * *